United States Patent
Caprioli et al.

(10) Patent No.: US 7,395,418 B1
(45) Date of Patent: Jul. 1, 2008

(54) USING A TRANSACTIONAL EXECUTION MECHANISM TO FREE UP PROCESSOR RESOURCES USED BY A BUSY-WAITING THREAD

(75) Inventors: Paul Caprioli, Mountain View, CA (US); Wayne Mesard, Belmont, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 134 days.

(21) Appl. No.: 11/234,669

(22) Filed: Sep. 22, 2005

(51) Int. Cl.
*G06F 9/44* (2006.01)
(52) U.S. Cl. .................................. 712/228; 712/229
(58) Field of Classification Search ................. 712/228, 712/229
See application file for complete search history.

(56) References Cited

U.S. PATENT DOCUMENTS

| | | | | |
|---|---|---|---|---|
| 5,649,136 | A * | 7/1997 | Shen et al. ................... | 712/244 |
| 6,272,517 | B1 * | 8/2001 | Yue et al. .................... | 718/102 |
| 6,772,294 | B2 * | 8/2004 | Civlin ........................ | 711/137 |
| 7,165,254 | B2 * | 1/2007 | Yoshida ...................... | 718/102 |
| 2002/0087810 | A1 * | 7/2002 | Boatright et al. ............ | 711/145 |
| 2003/0079094 | A1 * | 4/2003 | Rajwar et al. ............... | 711/150 |
| 2004/0093602 | A1 * | 5/2004 | Huston et al. ............... | 718/107 |
| 2004/0162951 | A1 * | 8/2004 | Jacobson et al. ............ | 711/143 |
| 2005/0246506 | A1 * | 11/2005 | Ukai ......................... | 711/152 |

OTHER PUBLICATIONS

Free On-Line Dictionary of Computing (FOLDOC). © 1995. www.foldoc.org☐☐search term: checkpoint.*
Dubois, Michel and Scheurich, Christoph. "Memory Access Dependencies in Shared-Memory Multiprocessors". IEEE Transactions on Software Engineering vol. 16, No. 6 © Jun. 1990. pp. 660-673.*
Dinning, Anne and Chonberg, Edith. "Detecting Access Anomalies in Programs with Critical Sections". ACM SIGPLAN Notices vol. 25, Issue 12 © 1991. pp. 85-96.*
Michael, Maged. "Scalable Lock-Free Dynamic Memory Allocation". ACM © 2004. pp. 1-12.*
Jon, Ruoming; Yang, Ge; and Agrawal, Gagane. "Shared Memory Parallelization of Data Mining Algorithms: Techniques, Programming Interface, and Performance". IEEE Transactions on Knowledge and Data Engineering vol. 17, No. 1 © Jan. 2005. pp. 71-89.*

* cited by examiner

*Primary Examiner*—Aimee J Li
(74) *Attorney, Agent, or Firm*—Park, Vaughan & Fleming LLP; Gilbert Wong

(57) ABSTRACT

A technique for improving the performance of a system that supports simultaneous multi-threading (SMT). When a first thread encounters a halt sequence, the system starts a transactional memory operation by generating a checkpoint and entering a transactional-execution mode. Next, the system loads from a mailbox address associated with the halt sequence. The system then stalls execution of the first thread, so that the first thread does not execute instructions within the halt sequence, thereby freeing up processor resources for other threads. To terminate the halt sequence, a second thread stores to the mailbox address, which causes a transactional-memory mechanism within the processor to detect an interference with the previous load from the mailbox address by the first thread and which causes the first thread to exit from the halt sequence. The system then continues executing instructions following the halt sequence.

15 Claims, 2 Drawing Sheets

```
WAIT_FOR(MAILBOX) {           WAKE_UP(MAILBOX) {
    CHECKPOINT FAIL_PC            STORE [MAILBOX]
    LOAD [MAILBOX]            }
    STALL FOREVER
FAILPC:    ...
}
```

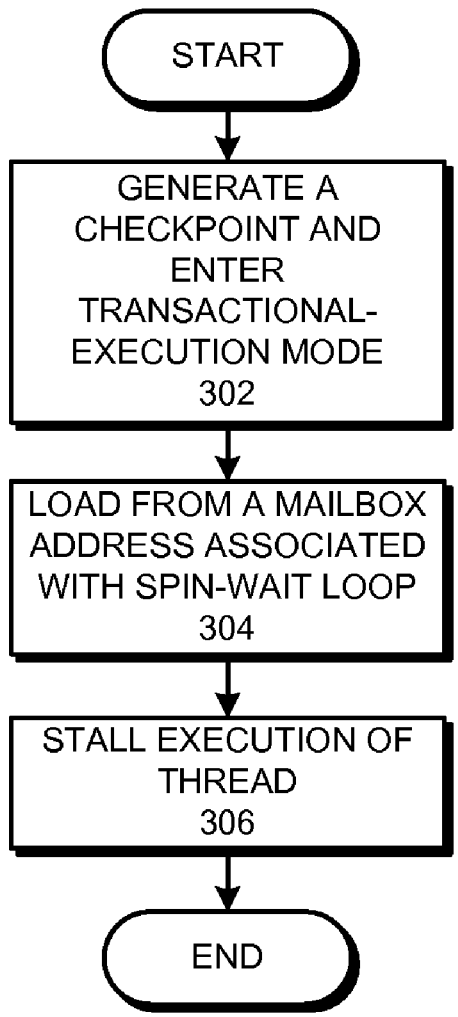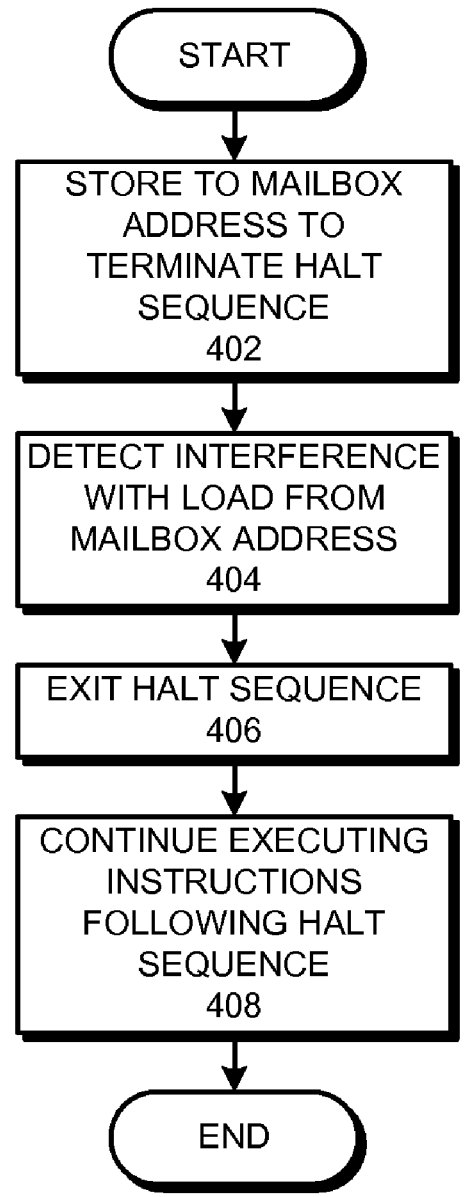
FIG. 3
FIG. 4

USING A TRANSACTIONAL EXECUTION MECHANISM TO FREE UP PROCESSOR RESOURCES USED BY A BUSY-WAITING THREAD

BACKGROUND

1. Field of the Invention

The present invention relates to techniques for improving performance in computer systems. More specifically, the present invention relates to a method and an apparatus for using a transactional execution mechanism to free up processor resources used by a busy-waiting thread.

2. Related Art

Advances in semiconductor technology presently make it possible to integrate large-scale systems, including tens of millions of transistors, onto a single semiconductor chip. Integrating such large-scale systems onto a single semiconductor chip increases the speed at which such systems can operate, because signals between system components do not have to cross chip boundaries, and are not subject to lengthy chip-to-chip propagation delays. This increased speed has translated into greatly increased processor performance.

At the same time, processor designers have been developing techniques to improve processor performance even further. For example, the simultaneous multi-threading (SMT) technique is used to improve performance by dynamically sharing processor resources between multiple threads which execute simultaneously. For example, FIG. 1 illustrates two threads executing simultaneously in two different pipelines of a processor. In this example, instructions from thread 102 execute in ALU pipeline 106 while instructions from thread 104 simultaneously execute in memory pipeline 108.

Although processors that support SMT generally utilize processor resources efficiently, in some situations, they still waste processor resources. For example, suppose that thread 102 is executing a program that performs useful work. At the same time, if thread 104 is in the idle loop (waiting for an event to occur), thread 104 is continually using processor resources to check to see if the event has occurred. These resources could otherwise be used by thread 102 to perform useful work. Note that the code block that causes a thread to wait for an event is referred to as "spin-wait loop," or a "busy-wait loop."

A spin-wait loop is also useful in a high-performance computing (HPC) code, which partitions a complex problem into smaller sub-problems to be solved in parallel. As these sub-problems execute in parallel, each sub-problem periodically communicates its results to other sub-problems. Some sub-problems complete more quickly than others. Hence, the threads that execute these sub-problems often have to wait for the other threads to complete their sub-problems. As each thread completes its assigned sub-problem, it enters a spin-wait loop which continually checks to see if all other sub-problems have completed. This is a performance problem because these spin-wait loops can waste processor resources that could otherwise be used to perform useful work.

Hence, what is needed is a method and an apparatus for freeing up processor resources while executing spin-wait loops in a computer system that supports SMT.

SUMMARY

One embodiment of the present invention improves performance of a system that supports simultaneous multi-threading (SMT). When a first thread encounters a halt sequence, the system starts a transactional memory operation by generating a checkpoint and entering a transactional-execution mode, wherein instructions are speculatively executed but results are not committed to the architectural state of the processor until the transaction completes without interference. Next, the system loads from a mailbox address associated with the halt sequence. The system then stalls execution of the first thread, so that the first thread does not execute instructions within the halt sequence, thereby freeing up processor resources for other threads. To terminate the halt sequence, a second thread stores to the mailbox address, which causes a transactional-memory mechanism within the processor to detect an interference with the previous load from the mailbox address by the first thread and which causes the first thread to exit from the halt sequence. The system then continues executing instructions following the halt sequence.

In a variation on this embodiment, stalling execution of the first thread involves executing a speculation-barrier instruction, wherein during transactional-execution mode, the speculation-barrier instruction prevents the first thread from executing subsequent instructions.

In a variation on this embodiment, the speculation-barrier instruction prevents the halt sequence from committing the transactional-memory operation.

In a variation on this embodiment, the halt sequence is implemented as a system call, a library function, or a macro.

In a variation on this embodiment, the second thread terminates the halt sequence (by writing to the mailbox) after calculating a result required by the first thread.

BRIEF DESCRIPTION OF THE FIGURES

FIG. 3 presents a flow chart illustrating the process of executing a halt sequence in accordance with an embodiment of the present invention.

FIG. 4 presents a flow chart illustrating the process of exiting a halt sequence in accordance with an embodiment of the present invention.

DETAILED DESCRIPTION

Figures 1, 2:
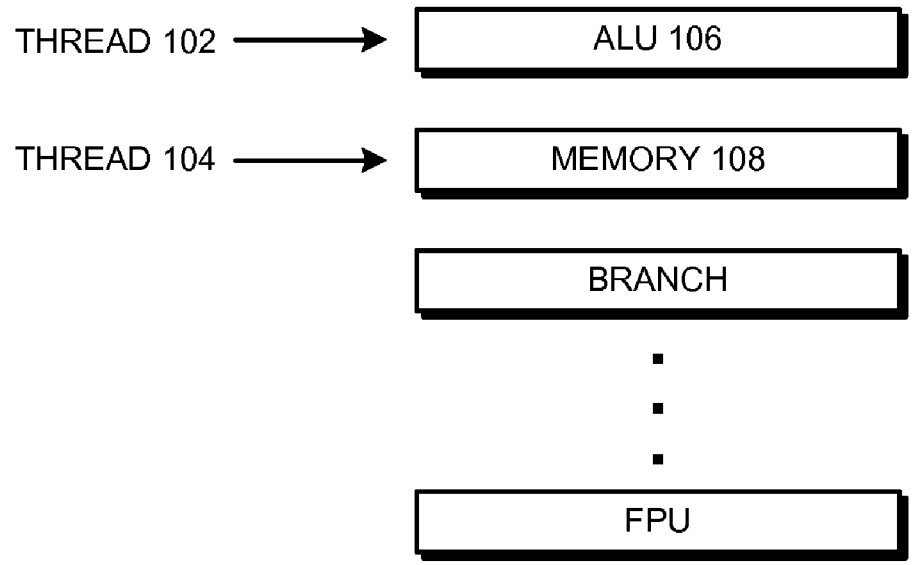
FIG. 1 illustrates two threads executing simultaneously in two different pipelines.
FIG. 2 presents a code block for a halt sequence in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Transactional Memory

The present invention uses a transactional-memory mechanism to free up processor resources when a processor encounters a halt sequence. Transactional memory is described in more detail in U.S. Pat. No. 6,862,664, entitled "Method and Apparatus for Avoiding Locks by Speculatively Executing Critical Sections," by inventors Shailender Chaudhry, Marc Tremblay, and Quinn Jacobson. The above-listed application is hereby incorporated by reference to provide details on how transactional memory operates and is herein referred to as "[Chaudhry]."

The transactional memory system in [Chaudhry] makes a critical section of code appear to execute atomically. Before entering the critical section, the processor executes a checkpoint instruction, to generate a checkpoint, which the processor can use to return execution to the point where the checkpoint was taken. If the critical section is successfully completed without interference from other threads, the processor performs a commit operation, to commit changes made during the speculative-execution mode. Note that the term "thread" is used to refer to a thread and a process within this specification. On the other hand, if another thread interferes with the thread executing the critical section, the thread aborts the transaction and discards the changes made during the speculative-execution mode. In other words, the critical section of code completes or fails as a single unit.

During speculative-execution mode, the system speculatively executes code within the critical section, without committing results of the speculative execution to the architectural state of the processor. The system also continually monitors data references made by other threads to determine if an interfering data access occurs during speculative-execution mode. If not, the system commits changes made during speculative-execution mode and then resumes execution of the first thread past the critical section in normal-execution mode.

On the other hand, if an interfering data access is detected, the system aborts the transaction and discards changes made during the speculative-execution mode.

Note that in the transactional memory system of [Chaudhry], an interfering data access can include a store by another thread to a cache line that has been load marked by the thread. It can also include a load or a store by another thread to a cache line that has been store marked by the thread.

Halt Sequence Code Block

FIG. 2 presents a code block that implements a halt sequence in accordance with an embodiment of the present invention. A first thread can invoke the halt sequence to wait for a condition to occur, such as waiting for a second thread to calculate a result needed by the first thread. The halt sequence code uses the transactional memory system to handle halt sequences without requiring the processor to continually execute code in the halt sequence to check to see if a condition is satisfied.

The halt sequence code first generates a checkpoint which has a corresponding fail_pc address. The first thread jumps to this fail_pc address when the transactional-memory operation fails. The halt sequence then loads from a "mailbox address." The halt sequence code then stalls the execution of the first thread. Note that the mailbox address is a location in memory which the second thread uses to notify the first thread that a condition is satisfied. When the condition is satisfied, the second thread stores to the mailbox address, thereby interfering with the previous load from the mailbox address by the first thread.

Note that since the halt sequence code stalls the execution of the thread forever, the first thread never reaches the commit instruction. In other words, the transactional-memory operation started by the halt sequence code never completes successfully.

Also note that once the first thread stalls, the first thread no longer executes instructions, which frees up processor resources. The first thread resumes execution of subsequent instructions only when another thread interferes with the transaction initiated by the first thread. Furthermore, note that other events can cause a transaction to fail (such as certain system events). Therefore, once the first thread resumes execution, it needs to verify that the waited-for condition has actually occurred by checking the mailbox to ensure that it contains the expected value.

A programmer can use the halt sequence code to stop execution of a thread to wait for a condition to occur. Note that the halt sequence can be implemented as a system call, a library function, or a macro.

Stalling Threads and Scout Mode

In a processor that supports scout mode, when a thread encounters a stall condition, it launches into scout mode. During scout mode, the processor speculatively executes instructions to prefetch future loads, but the processor does not commit the results to the architectural state of the processor. For example, see co-pending U.S. patent application Ser. No. 10/741,944, entitled "Generating Prefetches by Speculatively Executing Code Through Hardware Scout Threading," by inventors Shailender Chaudhry and Marc Tremblay, filed on 19 Dec. 2003, and published on 8 Jul. 2004. This patent application is hereby incorporated by reference herein to provide details on how scout mode operates.

Because a processor that supports scout mode simply launches into scout mode upon encountering a conventional stall instruction, a conventional stall instruction will not stop a thread from executing subsequent instructions. Hence, a different type of stall instruction is needed to prevent execution of subsequent instructions during scout mode. This new type of stall instruction is referred to as a "speculation-barrier" instruction.

In one embodiment of the present invention, when a thread encounters the checkpoint instruction of the halt sequence, it enters into a speculative-execution mode, such as scout mode. During speculative-execution mode, the processor first loads from the mailbox address and then executes the speculation-barrier instruction which prevents the thread from executing subsequent instructions. Note that if the thread is operating in normal-execution mode, the speculation-barrier instruction does not prevent the thread from executing instructions after the speculation-barrier instruction. However, note that because the halt sequence starts a transactional-memory operation, the speculation-barrier will be encountered while the thread is in speculative-execution mode. Therefore, it has the effect of stopping instruction execution until an event external to the thread causes speculative-execution mode to be terminated.

Stalling a Thread Using a Halt Sequence

FIG. 3 presents a flow chart illustrating the process of executing a halt sequence in accordance with an embodiment of the present invention. When a thread encounters a halt sequence, the system starts a transactional memory operation by generating a checkpoint and entering transactional-execution mode (step 302). Next, the thread executes a load from a mailbox address associated with the halt sequence (step 304). The thread then executes a stall instruction (or a speculation-barrier instruction) (step 306).

Waking Up a Thread From a Stalled Halt Sequence

FIG. 4 presents a flow chart illustrating the process of exiting a halt sequence in accordance with an embodiment of the present invention. The process begins when a second thread stores to the mailbox address to terminate the halt sequence (step 402). The process continues when the first thread detects the interference caused by second thread with the previous load from the mailbox address issued by the first thread (step 404). The first thread then exits the halt sequence (step 406) and continues executing instructions following the halt sequence (step 408).

In one embodiment of the present invention, the second thread terminates the halt sequence for the first thread after calculating a result required by the first thread.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for improving the performance of a processor that supports speculative execution, wherein when a first thread encounters a halt sequence which is used by the first thread to wait for data that is to be generated by a second thread, the method comprises:

starting a transactional memory operation by generating a checkpoint and entering transactional-execution mode, wherein instructions are speculatively executed but results are not committed to the architectural state of the processor until the transaction completes without interference;

loading from a mailbox address associated with the halt sequence so that a transactional memory system can detect a subsequent interference with the load from the mailbox address, wherein the subsequent interference with the load from the mailbox address indicates that the halt sequence is to be terminated; and while executing in a speculative-execution mode, stalling execution of the first thread, so that the processor does not execute instructions within the halt sequence, thereby freeing up processor resources for other threads;

wherein when the second thread has completed generating the data required by the first thread, the second thread performs a store operation to the mailbox address and a transactional-memory mechanism within the processor terminates the halt sequence by:

detecting an interference with the load from the mailbox address;

exiting the halt sequence; and continuing execution of instructions following the halt sequence.

2. The method of claim 1, wherein stalling execution of the first thread involves executing a speculation-barrier instruction, wherein during transactional-execution mode, the speculation-barrier instruction prevents the first thread from speculatively executing subsequent instructions.

3. The method of claim 2, wherein the speculation-barrier instruction prevents the halt sequence from committing the transactional-memory operation.

4. The method of claim 1, wherein the halt sequence is implemented as:

a system call;

a library function; or a macro.

5. The method of claim 1, wherein the second thread terminates the halt sequence for the first thread after calculating a result required by the first thread.

6. An apparatus for improving the performance of a processor that supports speculative execution, comprising:

an processing mechanism configured such that when a first thread encounters a halt sequence which is used by the first thread to wait for data that is to be generated by a second thread, the processing mechanism:

starts a transactional memory operation using a transactional-memory mechanism which involves generating a checkpoint and entering transactional-execution mode, wherein instructions are speculatively executed but results are not committed to the architectural state of the processor until the transaction completes without interference;

loads from a mailbox address associated with the halt sequence so that a transactional memory system can detect a subsequent interference with the load from the mailbox address, wherein the subsequent interference with the load from the mailbox address indicates that the halt sequence is to be terminated; and while executing in a speculative-execution mode, stalls execution of the first thread, so that the processor does not execute instructions within the halt sequence, thereby freeing up processor resources for other threads;

wherein when the second thread has completed generating the data required by the first thread, the second thread performs a store operation to the mailbox address and the transactional-memory mechanism within the processing mechanism is configured to:

detect an interference with the load from the mailbox address;

exit the halt sequence; and to continue execution of instructions following the halt sequence, thereby terminating the halt sequence.

7. The apparatus of claim 6, wherein stalling execution of the first thread involves executing a speculation-barrier instruction, wherein during transactional-execution mode, the speculation-barrier instruction prevents the first thread from speculatively executing subsequent instructions.

8. The apparatus of claim 7, wherein the speculation-barrier instruction prevents the halt sequence from committing the transactional-memory operation.

9. The apparatus of claim 6, wherein the halt sequence is implemented as:

a system call;

a library function; or a macro.

10. The apparatus of claim 6, wherein the second thread terminates the halt sequence for the first thread after calculating a result required by the first thread.

11. A computer system for improving the performance of a processor that supports speculative execution, comprising:

the processor;

a memory; and a transactional-memory mechanism;

wherein when a first thread encounters a halt sequence which is used by the first thread to wait for data that is to be generated by a second thread, the processor is configured to:

start a transactional memory operation using the transactional-memory mechanism which involves generating a checkpoint and entering transactional-execution mode, wherein instructions are speculatively executed but results are not committed to the architectural state of the processor until the transaction completes without interference;

load from a mailbox address associated with the halt sequence so that a transactional memory system can detect a subsequent interference with the load from the mailbox address wherein the subsequent interference with the load from the mailbox address indicates that the halt sequence is to be terminated; and while executing in a speculative-execution mode, stall execution of the first thread, so that the processor does not execute instructions within the halt sequence, thereby freeing up processor resources for other threads;

wherein when the second thread has completed generating the data required by the first thread, the second thread performs a store operation to the mailbox address and the transactional-memory mechanism within the processing mechanism is configured to:

detect an interference with the load from the mailbox address;

exit the halt sequence; and to continue execution of instructions following the halt sequence, thereby terminating the halt sequence.

12. The computer system of claim 11, wherein stalling execution of the first thread involves executing a speculation-barrier instruction, wherein during transactional-execution mode, the speculation-barrier instruction prevents the first thread from speculatively executing subsequent instructions.

13. The computer system of claim 12, wherein the speculation-barrier instruction prevents the halt sequence from committing the transactional-memory operation.

14. The computer system of claim 11, wherein the halt sequence is implemented as:

a system call;
a library function; or
a macro.

15. The computer system of claim 11, wherein the second thread terminates the halt sequence for the first thread after calculating a result required by the first thread.

* * * * *